United States Patent

[11] 3,616,972

| [72] | Inventor | Daniel Lamar Christy<br>R.F.D. 5, Fremont, Ohio 43420 |
|---|---|---|
| [21] | Appl. No. | 871,404 |
| [22] | Filed | Sept. 18, 1969 |
| [23] | | Division of Ser. No. 641,725, Apr. 26, 1967, abandoned. |
| [45] | Patented | Nov. 2, 1971 |

[54] MACHINE FOR DISPENSING AND DISTRIBUTING DRY FLOWABLE MATERIALS
9 Claims, 3 Drawing Figs.

[52] U.S. Cl. .................................................. 222/317,
222/414, 222/459, 118/308
[51] Int. Cl. ..................................................... G01f 11/00
[50] Field of Search .......................................... 222/290,
414, 317, 459, 410; 118/308

[56] References Cited
UNITED STATES PATENTS

| 1,345,120 | 6/1920 | Bissell et al. .................. | 222/317 |
| 2,658,603 | 11/1953 | Fernald ......................... | 222/459 X |
| 3,121,515 | 2/1964 | Johnson et al. ................ | 222/317 |
| 166,997 | 8/1875 | Lynam .......................... | 222/414 X |
| 1,447,722 | 3/1923 | Henriksen ..................... | 222/414 X |
| 2,698,704 | 1/1955 | Beasley ......................... | 222/414 X |
| 2,738,713 | 3/1956 | Buczkowski et al. .......... | 118/308 X |
| 2,740,725 | 4/1956 | Ball .............................. | 118/308 X |

FOREIGN PATENTS

| 690,456 | 6/1930 | France ......................... | 222/414 |

*Primary Examiner*—Robert B. Reeves
*Assistant Examiner*—Frederick R. Handren
*Attorney*—Oberlin, Maky, Donnelly & Renner

ABSTRACT: A machine for effecting the controlled dispersed or disseminated discharge of dry or substantially dry edible or nonedible products consisting of a walled body receiving and supporting a hopper having a dispensing roll rotatably mounted within the same laterally of its discharge way in communicative relation thereto, a pair of converging flow-directing and regulating cute plates on the hopper sidewalls communicating with its discharge way, one of which is fixed and the other vertically adjustable whereby to effect a variable discharge of material onto one side of the roll and its carriage thereover for free and disseminated downward discharge from its opposite side.

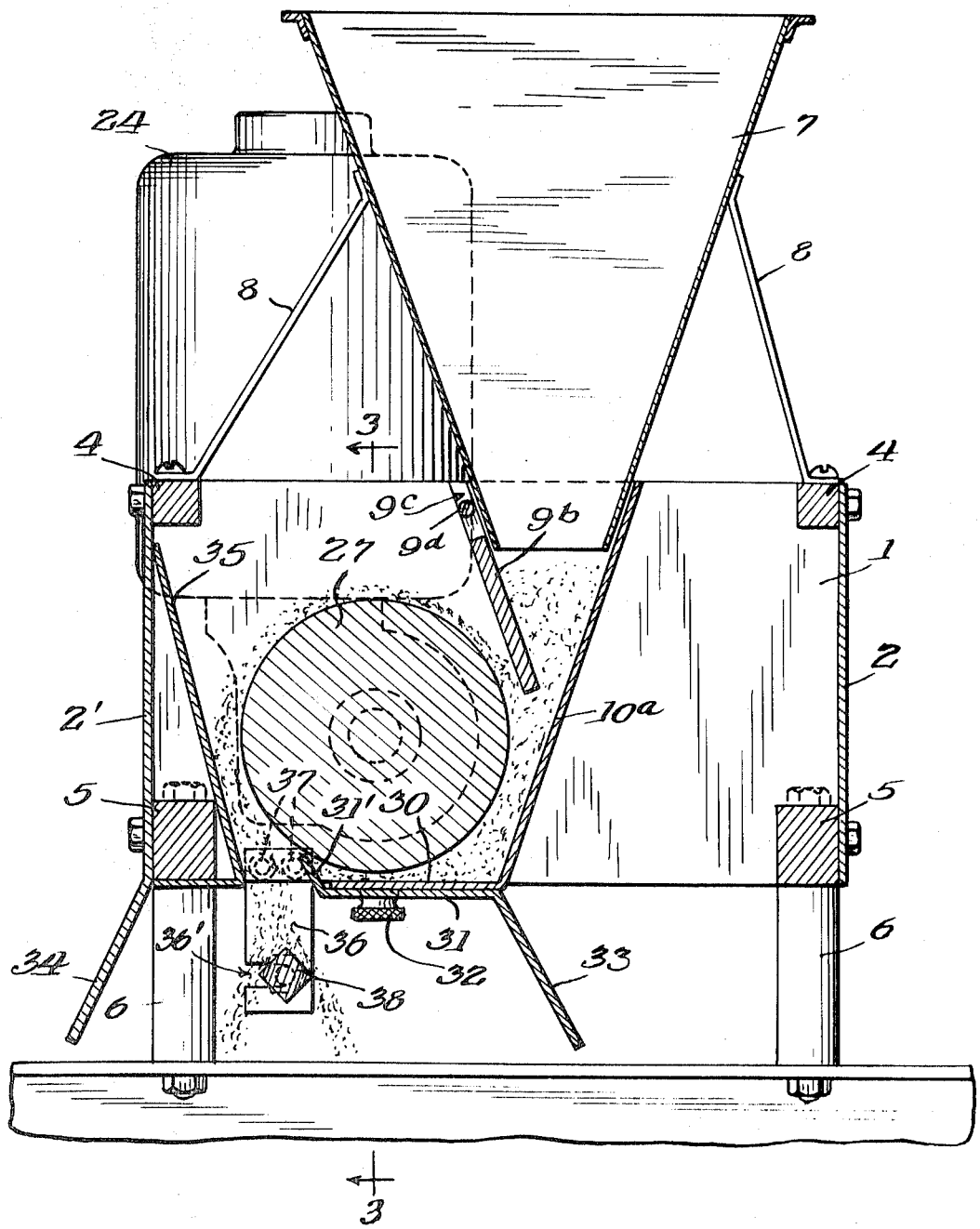

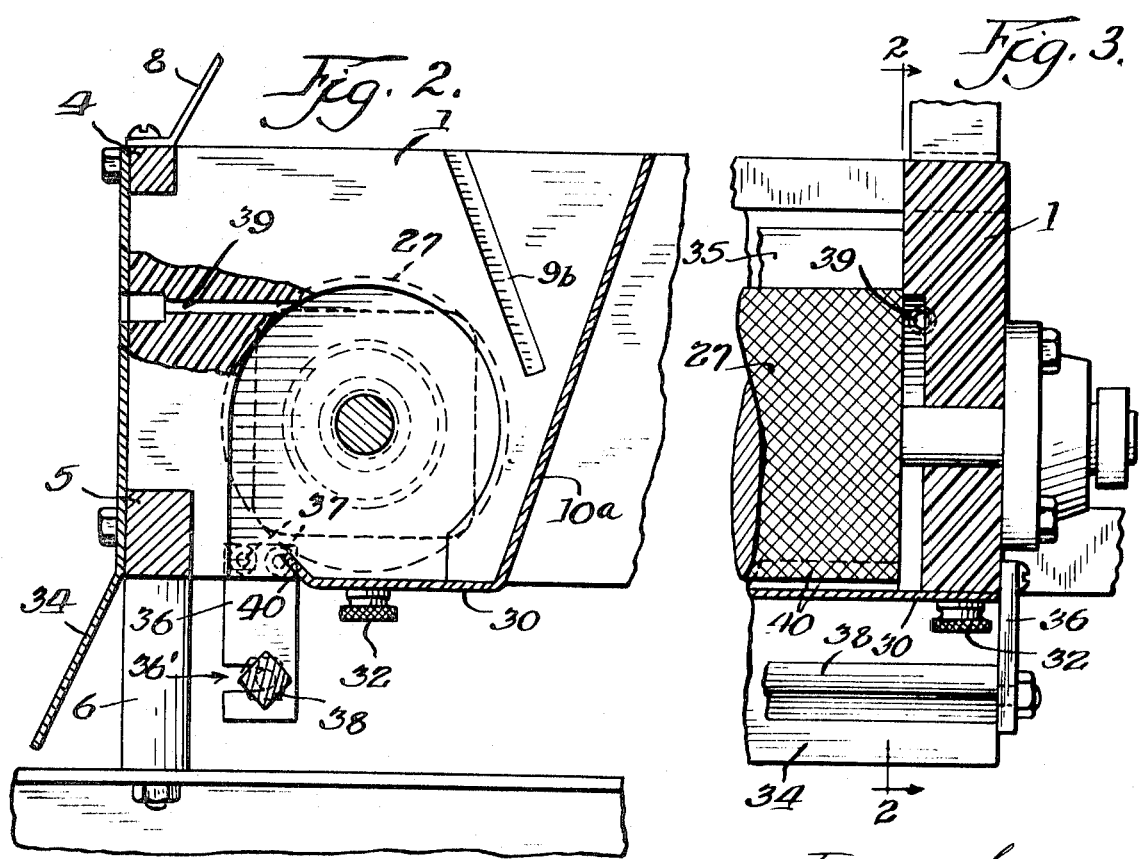

3,616,972

MACHINE FOR DISPENSING AND DISTRIBUTING DRY FLOWABLE MATERIALS

The application is a division of my application for patent filed Apr. 26, 1967, Ser. No. 641,725 entitled a MACHINE FOR DISPENSING AND DISTRIBUTING DRY FLOWABLE MATERIALS.

This invention relates to improvements in machines for effecting the controlled disseminated discharge of various forms and kinds of flowable dry or substantially dry edible or nonedible materials onto and over edible or nonedible products, as for example, salt, sugar, edible seeds or other taste-improving, garnishing and/or decorative materials onto biscuits, cakes, crackers, potato and other edible chips, pretzels, rolls and other bakery or edible products, or nonedible appearance-embellishing or utilitarian matters or materials onto nonedible products.

BACKGROUND OF THE INVENTION

Heretofore, in the coating or topping of edible and/or nonedible products with dry or substantially dry or flowable materials (flaked, granular, powdered, etc.) machines have been developed and used for effecting same. Insofar as known, they have not been overall successful; moreover they have been of complex and costly construction, plus, operationally undependable.

To remedy and eliminate these general disadvantages and deficiencies, the present invention has evolved.

SUMMARY OF THE INVENTION

The principal objects of the invention are to provide a machine of the indicated character which is relatively economical in operation by means of which flakes, granular, powdered, and similar materials or products (edible or nonedible) will be delivered in substantially regulated free and constant flow to a dispensing roll received by and carried on its peripheral surface and discharged therefrom in disseminated, even and uniform fashion for deposit on a receiving body or bodies; to prevent the compacting or packing of material or products hence flow stoppage as it or they flow in measured amounts from the machine hopper onto its dispensing roll thereby assuring continued or steady supply to said roll; to assure a final and thorough cascadelike dispersion and spreading of the roll discharged material onto and over the receiving body or bodies, and which, by reason of its simplicity of construction and arrangement of active or operative parts may be readily and thoroughly cleaned, hence, satisfactorily maintained in compliance with area prescribed and required sanitation ordinances.

These and other objects of the invention will become apparent from the following description when read in conjunction with the appended claims and accompanying drawings.

BRIEF DESCRIPTION OF THE DRAWINGS

FIG. 1 is a vertical transverse section through my improved machine showing the arrangement and construction of the material flow-regulating means relative to the hopper discharge way and the dispensing roll, plus its material receiving, mounting and relation thereto;

FIG. 2 is a fragmentary section taken on the line 2—2 of FIG. 3 looking in the direction in which the arrows point, and, FIG. 3 is a fragmentary section taken on the line 3—3 of FIG. 1, looking in the direction in which the arrows point.

DESCRIPTION OF THE PREFERRED EMBODIMENT

Referring in detail to the invention the machine comprises a substantially rectangularly shaped body including end walls 1 and sidewalls 2–2', the end walls being of thickness and strength to effectively mount and support its working parts or components and the sidewalls being secured to longitudinally disposed frame bars 4 and 5, the latter having legs 6 connect thereto and fixedly mounted on the spaced transverse bars or rails of a suitable bed.

A hopper 7 is received in and longitudinally of the body supported on and by legs 8 mounted on and connected to appropriate portions of the bars 4.

Downwardly converging chute plates 9b and 10a are engaged with and receive the open material discharge lower end of the hopper therebetween, as shown in FIG. 1, the plate 9b being vertically adjustable in appropriate ways formed in the inner faces of the machine body end walls and secured in desired adjusted position with relation to the fixed or nonadjustable chute plate 10a by engaged abutments or stops 9c in said receiving ways and locking them against sliding or shifting movement by screws 9d, and the plate 10a being suitably fixedly connected to side adjacent sidewall of the hopper and supported thereby and extended downwardly to a point below a dispensing roll 27, presently described, where it is formed with an inwardly disposed horizontal flange 30 underlying said roll in spaced relation throughout its length. A plate 31 of length corresponding to that of the flange 30 is flushly engaged thereover and preferably detachably secured thereto by thumbscrews, one of which is shown and designated by the reference numeral 32. Its outer side is upwardly flanged or lipped, as at 31' and spaced from the dispensing roll periphery, while its opposite side is formed with a downwardly and outwardly obliqued apronlike air current baffle 33 of appropriate depth, the purpose of which is hereinafter described.

A material receiving and dispensing roll 27 driven by a motor 24 suitably mounted on the machine body is counterclockwise rotatably mounted in and disposed longitudinally of the machine body in spaced and apposed relation to the lower side of the adjustable chute plate 9b. Thus, it will be seen that the metered discharge flow of the material from the way between the chute plates 9b and 10a will be laterally and outwardly therefrom onto and along the upper portion of the inner side of the roll periphery (See FIG. 1) thence, carried upwardly and outwardly therefore avoiding or preventing its packing or partially solidifying and resultant flow stoppage, or if not this, then irregular and unsatisfactory dispensing. Moreover, because a reservoir or the material being dispensed will be maintained constant in the lipped horizontal flange 30 and between the lower inner side of the roll periphery and the adjacent portion of the fixed chute plate 10a the constant flow or travel of such material upwardly and outwardly over and from the dispensing roll will be assured whereby to effect an even cascadelike discharge onto product therebelow.

A second downwardly and outwardly obliqued air current baffle 34 is formed on and along the lower side of the machine body front sidewall 2' outwardly of the dispensing roll 27 in spaced relation to the baffle 33.

By reason of the baffles 33–34 undesirable scattering and waste of materials dispensed by the roll 27 will be prevented, thus assuring the effective coating or topping of products in connection with which the machine is being used.

To complete the housing of the dispensing roll 27 in order that material dispensed therefrom in the manner described and shown in FIG. 1 (cascaded downwardly) will be effectively directed to and onto products arranged or traveling therebelow an inwardly inclined wall 35 is fixedly mounted in the machine body in spaced relation to said roll, terminating in a horizontal plane substantially corresponding to that of the flange 30 and plate 31. Thereby, a discharge way for the roll-dispensed material is provided. As a further means for effectively and directionally scattering the downward flow of material falling from the dispensing roll through the discharge way, depending brackets 36 are fixedly mounted on the machine body end walls adjacent the opposite ends of the discharge way, as at 37. Each has outwardly opening horizontal slots 36' formed in their lower portions whereby to receive and support a cross-sectionally square deflector bar 38 longitudinally of the body below and in vertical alignment with said discharge way (see FIGS. 1 and 3). Hence, as the falling dispensed material flow impinges upon the angled sides of the bar, it will be further disseminated or scattered. Because the deflector bar is shielded by (housed therebetween) the air current baffles 33 and 34, it will be prevented from being excessively scattered and wasted, i.e., so scattered that it will fall beyond the receiving products, or unevenly deposited thereon.

To prevent adhesion or encrustations of materials to and on the dispensing roll 27, as well as other exposed parts of the machine, especially materials of hydroscopic characters, and to assure its maintenance in clean and sanitary condition, outwardly opening ducts 39 are formed in the body end walls in the manner shown in FIGS. 2 and 3 of the drawings, communicating with the roll and the body interior portions. By blasting compressed air therethrough, residual and adhering materials, or encrustations thereof will be effectively removed.

If desired, as shown in FIG. 2, use of the plate 31 with its flange or lip 31' and air baffle 33 may be eliminated. In such event, the free and inner side of the flange 30 is formed with an upwardly disposed lip 40 similar to the flange or lip 31' of the plate 31.

It will be understood that comminuted material passing downwardly from the chute plates 9b and 10a will be received on the horizontal flange 30 whereupon it will be "picked up" by the dispensing roll 27 and moved in a counterclockwise direction thereover (see FIG. 1) and finally discharged therefrom through the hereinbefore described discharge way onto the angular upper sides of the deflector bar 38, thereby further dispersed for even and uniform deposit onto products.

From the foregoing description of my invention, it is apparent that an important essential characteristic or feature thereof resides in the manner or method of delivering the salt, or other divided materials, to the dispensing roll 27 of the machine. It is supplied from the machine hopper to and between the plates 9b and 10a, and thereupon outflowed therefrom in selectively metered quantity to the roll 27. By reason of the lateral outflowing of the loosely lying slat, etc. via the level-seeking and maintained feed or supply thereof from the reservoir between said plates, 9b and 10a and then frontwardly of the plate 9b, a dependably constant and uniform delivery and sprinkling onto the receiving products is assured. As the loose salt etc. is discharged from the lateral and outward outlet provided by the metering discharge way between the plates, the supply thereof is constantly maintained. The receiving roll, rotating at a preselected speed, acts to displace the outflowing salt etc. and convey it upwardly thereover from whence it is discharged in cascadelike form onto receiving products. It is here noted and emphasized that the roll 27 does not pick up the salt from the plates near or at the bottom; rather, once the flow of the salt reaches a level between the plate discharge way and the upper portion of the roll, it freely spills over onto the roll and is carried upwardly thereby for the ultimate cascadelike discharge therefrom.

It will be understood that the dispensing roll 27, may, if desired or required, be replaced by other and similar rolls whole peripheral surfaces are plain, smooth, indented or formed or provided with corrugations or pockets of different forms and sizes dependent upon the character and kind of materials which are to be dispensed by the machine.

It will also be understood that whereas I have described the usage of the machine for dispensing edible matters, i.e., certain herein-named products, its use is in no manner limited to such. The machine, obviously, may be employed equally advantageously for dispensing, coating and/or sprinkling nonedible matters or materials onto nonedible bodies or products.

Furthermore, it is to be understood that my improved machine may be constructed in different widths whereby to increase the output or discharge of flowable edible and/or nonedible matters therefrom; also, that two or more of said machines may be arranged in endwise relation in order to increase the width or output of flowable materials therefrom, or for that matter, the machines may be arranged, if desired, in relatively tandem relation to assure a satisfactory coating of edible or nonedible matters moving therebeneath.

I claim:

1. A machine for dispensing and distributing flowable particulated material onto and over a receiving body comprising a hopper for the material, said hopper having a bottom outlet for discharge of the material therefrom, a pair of relatively converging chute plates extending downwardly from said hopper in communication with said hopper outlet, said chute plates defining a discharge way therebetween, a roll rotatably supported below and offset laterally from one of said chute plates in communicative relation with said discharge way, the other of said chute plates extending obliquely downwardly below below said one chute plate and below the lower periphery of said roll, said other chute plate having a flange portion extending underneath said roll in spaced relation thereto and terminating in an upturned lip which projects upwardly above said flange portion in closely spaced relation to the periphery of said roll forming a material supply and flow way which extends beneath said roll and adjacent one side thereof, means for rotating said roll in a direction causing the material to be carried upwardly by said roll and discharged from the other side of said roll, and spaced apart baffle means beneath said roll, one of said baffle means comprising a longitudinally extending flange extending downwardly and outwardly from the underside of said flange portion of said other chute plate.

2. The machine of claim 1 further comprising a plate fixed to the underside of said flange portion, said one baffle means extending downwardly and outwardly from said plate.

3. The machine of claim 2 wherein said upturned lip is carried by said plate.

4. The machine of claim 1 wherein means are provided for adjusting the position of said one chute plate with respect to said other chute plate for varying the size of said discharge way.

5. The machine of claim 1 further comprising an inwardly inclined wall adjacent the other side of said roll defining with said other side of said roll a discharge way for the roll dispensed material.

6. The machine of claim 1 further comprising deflector means disposed below the other side of said roll in vertical alignment therewith for scattering the downward flow of material from said other side of said roll, and means for mounting said deflector means in place.

7. A machine for dispensing and distributing flowable particulated material onto and over a receiving body comprising a hopper for the material, said hopper having a bottom outlet for discharge of the material therefrom, a pair of relatively converging chute plates extending downwardly from said hopper in communication with said hopper outlet, said chute plates defining a discharge way therebetween, a roll rotatably supported below and offset laterally from one of said chute plates in communicative relation with said discharge way, the other of said chute plates extending obliquely downwardly below said one chute plate and below the lower periphery of said roll, said other chute plate having a flange portion extending underneath said roll in spaced relation thereto and terminating in an upturned lip which projects upwardly above said flange portion in closely spaced relation to the periphery of said roll forming a material supply and flow way which extends beneath said roll and adjacent one side thereof, means for rotating said roll in a direction causing the material to be carried upwardly by said roll and discharged from the other side of said roll, an elongated deflector bar disposed below the other side of said roll in vertical alignment therewith for scattering the downward flow of material from said other side of said roll, and means for mounting said deflector bar in place, said last-mentioned means comprising a pair of longitudinally spaced brackets beneath said roll, said brackets having horizontal slots for receipt of the ends of said deflector bar.

8. A machine for dispensing and distributing flowable particulated material onto and over a receiving body comprising a hopper for the material, said hopper having an outlet for discharge of the material therefrom, a roll rotatably supported below said hopper in communicative relation with said hopper outlet for dispensing such material during rotation thereof, an elongated deflector bar disposed below said roll in vertical alignment therewith for scattering the downward flow of material from said roll, and spaced apart baffle means on opposite sides of said deflector bar for confining the scattered material between said baffle means, said deflector bar being rectangular in section and having one edge facing upwardly for scattering the downward flow of material as aforesaid.

9. The machine of claim 8 further comprising a pair of longitudinally spaced brackets beneath said roll, said brackets having horizontal slots for receipt of the ends of said deflector bar.

* * * * *